US010756898B2

(12) United States Patent
Puentes

(10) Patent No.: US 10,756,898 B2
(45) Date of Patent: Aug. 25, 2020

(54) CONTENT DELIVERY VERIFICATION

(71) Applicant: Rebel AI LLC, Louisville, CO (US)

(72) Inventor: Emmanuel Puentes, Erie, CO (US)

(73) Assignee: Rebel AI LLC, Louisville, CO (US)

(*) Notice: Subject to any disclaimer, the term of this patent is extended or adjusted under 35 U.S.C. 154(b) by 303 days.

(21) Appl. No.: 16/006,216

(22) Filed: Jun. 12, 2018

(65) Prior Publication Data

US 2018/0359091 A1 Dec. 13, 2018

Related U.S. Application Data

(60) Provisional application No. 62/518,461, filed on Jun. 12, 2017.

(51) Int. Cl.
H04L 9/32 (2006.01)
H04L 29/06 (2006.01)

(52) U.S. Cl.
CPC .......... H04L 9/321 (2013.01); H04L 9/3247 (2013.01); H04L 63/0428 (2013.01); H04L 63/123 (2013.01); H04L 9/3236 (2013.01)

(58) Field of Classification Search
CPC ... H04L 9/321; H04L 9/3247; H04L 63/0428; H04L 63/123
See application file for complete search history.

(56) References Cited

U.S. PATENT DOCUMENTS

| 5,838,790 A * | 11/1998 | McAuliffe ........... G06Q 20/085 713/176 |
| 7,680,937 B2 | 3/2010 | Miller et al. |
| 7,809,943 B2 | 10/2010 | Seidel |
| 8,543,821 B1 * | 9/2013 | Gabrielson ...... H04N 21/23476 713/171 |
| 9,444,795 B1 * | 9/2016 | Kowalski ............ H04L 63/0428 |
| 10,205,597 B2 * | 2/2019 | Ali .......................... G06F 21/10 |
| 2003/0070070 A1 | 4/2003 | Yeager et al. |
| 2004/0128535 A1 * | 7/2004 | Cheng ................. G06F 21/6209 380/285 |

(Continued)

FOREIGN PATENT DOCUMENTS

| CN | 202696901 U | 1/2013 |
| CN | 104584029 A | 4/2015 |

(Continued)

Primary Examiner — Vance M Little

(57) ABSTRACT

Examples of the present disclosure describe systems and methods relating to content delivery verification. In an example, a root authority is used to provide aspects of content delivery verification. The root authority receives supplemental content from a content source, which it uses to generate secured content. The content source provides the secured content to a publisher (e.g., directly or indirectly, e.g., via a content marketplace). In examples, the root authority evaluates at least a part of the secured content and/or information associated with the publisher to determine whether the unsecured content should be displayed by the publisher on a client device. In other examples, the client device may perform verification aspects. If it is determined that the content should be displayed, the unsecured content may be provided for display. If, however, it is determined that the content should not be displayed, alternate content may instead be provided.

20 Claims, 11 Drawing Sheets

(56) References Cited

U.S. PATENT DOCUMENTS

| | | | |
|---|---|---|---|
| 2005/0033700 A1* | 2/2005 | Vogler | H04N 21/4627 705/57 |
| 2006/0122936 A1 | 6/2006 | Balfanz | |
| 2007/0219915 A1* | 9/2007 | Hatano | H04L 9/083 705/57 |
| 2010/0323716 A1 | 12/2010 | Jaffri | |
| 2011/0167003 A1* | 7/2011 | Nice | H04L 67/20 705/50 |
| 2014/0180835 A1* | 6/2014 | Bitran | G06F 21/6209 705/14.73 |
| 2015/0229995 A1* | 8/2015 | Haberman | H04N 21/44222 725/14 |
| 2016/0219332 A1* | 7/2016 | Asbun | H04N 21/4532 |

FOREIGN PATENT DOCUMENTS

| | | | | |
|---|---|---|---|---|
| KR | 1020080064164 A | 7/2008 | | |
| WO | 2002010962 A1 | 2/2002 | | |
| WO | 02077847 A1 | 10/2002 | | |
| WO | 2005060138 A2 | 6/2005 | | |
| WO | 2010011876 A2 | 1/2010 | | |
| WO | 2012177420 A1 | 12/2012 | | |
| WO | WO-2016156513 A1 * | 10/2016 | | G06Q 30/0277 |
| WO | 2017177449 A1 | 10/2017 | | |

* cited by examiner

CONTENT DELIVERY VERIFICATION

CROSS-REFERENCE TO RELATED APPLICATION

This application claims priority to U.S. Provisional Application No. 62/518,461, entitled "Targeted Content Delivery Verification," filed on Jun. 12, 2017, the entire disclosure of which is hereby incorporated by reference in its entirety.

BACKGROUND

In the digital age, users use client devices to view articles and other primary content from many different publishers (e.g., THE NEW YORK TIMES, ESPN, YOUTUBE, etc.). Publishers often desire to show additional or supplemental content from "content sources," which, in some examples, is in exchange for some amount of revenue. Content sources make supplemental content available to publishers through a content marketplace. Often, a content source wants to control the display of such supplemental content. Unfortunately, fraudulent publishers are also able to access the content marketplace, such that undesirable delivery and/or display of supplemental content may occur.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to content delivery verification. A root authority is used to provide content delivery verification. In examples, the root authority receives supplemental content from a content source, which it uses to generate secured content. The content source then provides the secured content to a publisher for display in conjunction with articles and other primary content of the publisher. In some examples, the secured content is provided to the publisher indirectly by way of a content marketplace. When the secured content is provided to a publisher (e.g., directly, indirectly via the content marketplace, etc.), verification is performed to verify that the supplemental content associated with the secured content should be displayed by the publisher.

For example, the root authority evaluates at least a part of the secured content and/or information associated with the publisher to determine whether the supplemental content should be displayed. If the root authority determines that the content should be displayed, the root authority enables the content to be displayed by the publisher (e.g., by providing decrypted supplemental content, by providing one or more decryption keys, etc.). As another example, at least a part of the verification is performed by the client device, such that the secured content is used to verify whether the content should be displayed. If, however, it is determined that the content should not be displayed, alternate content is displayed in place of the content and/or data is collected, among other examples. As a result, the content source is assured as to the publisher and client device to which the content was provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
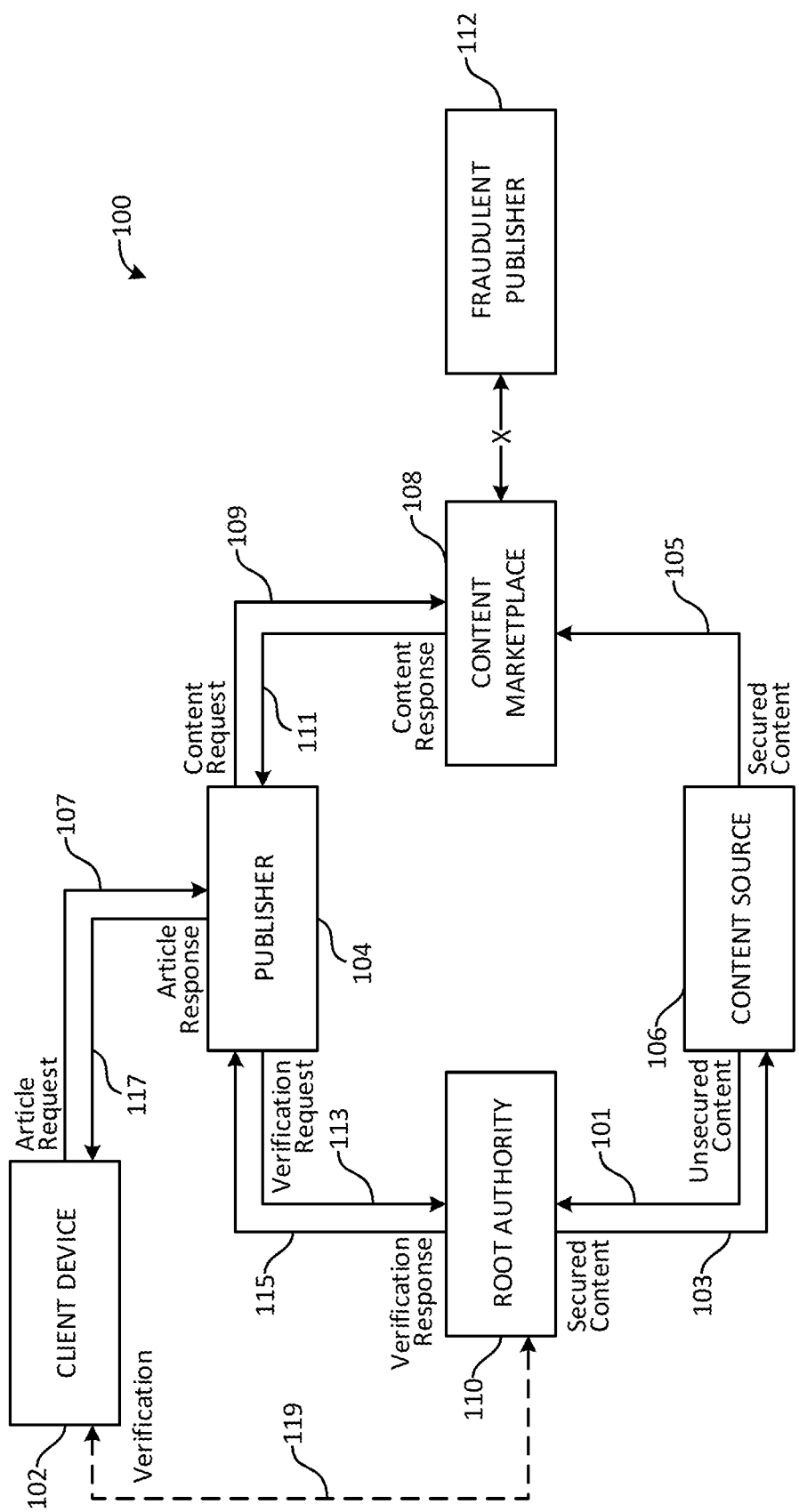
FIG. 1A illustrates an overview of an example system for content delivery verification, illustrating a root authority in conjunction with a publisher, content marketplace, and content source.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects.

A publisher (e.g., a website, a desktop or mobile application, or a computing device such as a mobile computing device or an Internet of Things device, among other publishers) provides primary content (e.g., web pages, articles, videos, images, software, etc.) to a client device for display to a user. For simplicity, "articles" and "primary content" is used interchangeably herein, though it will be appreciated that aspects of the present disclosure apply to any of a variety of primary content from a publisher. In examples, supplemental content from a content source is accessed for display in conjunction with an article from the publisher. In such examples, the content source pays for the supplemental content to be displayed, while the publisher receives revenue for displaying the content.

In an example, a content marketplace is used to indirectly provide the content to the publisher, such that the content source bids in the content marketplace to pay for the supplemental content to be provided in conjunction with articles from the publisher. However, fraudulent publishers are also able to access the marketplace, and are able to masquerade as legitimate publishers, such that the content source pays to display its supplemental content via what appears to be a legitimate publisher, while the fraudulent publisher receives the revenue instead. For example, a content source can specify that its supplemental content is to be displayed on a news site. However, if an adult site masquerading as the news site accesses the supplemental content from the marketplace, the content source will be unaware that the supplemental content has been displayed by the fraudulent publisher.

This is undesirable for at least two reasons: first, the content source errantly paid for its supplemental content to be displayed by an incorrect publisher; and second, the content source was inadvertently associated with the fraudulent publisher, which can have a negative effect on the perception of the content source. As an example, if the content source is a candy company, it is unlikely that the candy company would want to be associated with adult content.

In another example, a fraudulent publisher can simulate providing supplemental content to a client device, when, in actuality, the content was not actually displayed on the client device. Such problems arise, at least in part, as a result of the indirect relationship between the content source and the publisher afforded by the content marketplace, wherein it is difficult for the content source to verify that the supplemental content was in fact displayed by the publisher for which it bid in the content marketplace. Similarly, it is difficult to verify that the supplemental content was displayed to its intended audience (e.g., based on age, gender, income level, geolocation region, etc.). However, it is typically not feasible for publishers and content sources to have direct relationships with one another, especially given the large number of content sources that wish to provide supplemental content to a publisher and the large number of publishers wishing to display supplemental content from a content source.

The present disclosure provides systems and methods relating to content delivery verification. As used herein, supplemental content is any of a wide variety of content for display in combination with articles and/or other primary content from a publisher, including, but not limited to, text, one or more images, video, computer-executable instructions, or any combination thereof. In some examples, supplemental content is "targeted," such that the content has an intended audience, mobile device platform type, and/or geographic region, among other examples. A root authority provides aspects of content delivery verification according to aspects disclosed herein. In examples, the root authority is a server computing device, a distributed computing device, or any other type of computing device. In some examples, the root authority is a process provided by a computing device of a publisher, a content source, or a content marketplace. In an example, a content source provides supplemental content to a root authority, such that the root authority generates secured content based on the supplemental content. As a result, when providing supplemental content for display in conjunction with articles from a publisher (either directly or indirectly, e.g., via a content marketplace) as discussed above, the content source provides the secured content rather than providing the unsecured content. In examples, this enables a content source to interact with or use an existing content marketplace and/or provide content directly to a publisher without implementing additional security or verification procedures.

A publisher registers with or is otherwise known by the root authority, such that the root authority is able to identify the publisher. In an example, the root authority stores information associated with a publisher, such as one or more Internet Protocol (IP) addresses, domain names, or software or hardware information (e.g., an operating system version, an application version, hardware technical specifications, etc.), among other information. In another example, the root authority generates and/or stores a cryptographic signature or key associated with the publisher, which may later be used by the root authority to verify subsequent information received from the publisher and/or information provided to the publisher. As an example, the root authority stores a cryptographic key or key pair, while the publisher has access to the private key of the cryptographic key pair. The publisher uses the private key to generate a signature (e.g., of secured content), which the root authority then validates based on the public key.

In another example, a cryptographic key associated with a publisher is used to sign and/or encrypt supplemental content from a content source to generate encrypted content. Accordingly, when the encrypted content is provided to a publisher, it is possible to perform verification based on the cryptographic key associated with the publisher. As a result, the encrypted content may be verified and/or decrypted using the associated cryptographic key, thereby ensuring that the encrypted content is actually displayed by the publisher associated with the cryptographic key. In examples, aspects of the verification are performed by a publisher, by the root authority, and/or by the client device, among other examples.

For example, when the secured content is provided via a content marketplace to a publisher for display on a client device, the publisher is verified using the root authority. Verification may be performed by the publisher, such that the publisher may communicate with the root authority in order to generate unsecured content for display by a client device based on the secured content. As an example, the publisher provides at least a part of the secured content to the root authority. In some examples, the publisher also provides additional information, such as a cryptographic signature (e.g., as may have been generated using a private key as discussed above) or a token that was provided to the publisher by the root authority. The root authority evaluates the received information to verify the publisher. The evaluation may comprise comparing known information about the publisher to received or gathered information (e.g., comparing a requestor's IP address to a list of known IP addresses for the publisher, verifying a cryptographic hash or field, etc.). If the root authority is able to verify the publisher, the root authority provides at least a part of the supplemental content of the content source to the publisher. If, however, the root authority is unable to verify the publisher, no content is provided, an indication is provided that content is unavailable, or alternate content is displayed, among other examples.

In another example, the publisher provides the secured content to a client device, such that the client device verifies the publisher. The client device may receive information in addition to the secured content, such as a cryptographic signature or a token, as was discussed above. As an example, the client provides at least a part of the secured content and the additional information to the root authority, such that the root authority verifies the publisher as was described above. If the root authority is able to verify the publisher, the root authority may provide the supplemental content (e.g., that was received from the content source) to the publisher. If, however, the root authority is unable to verify the publisher, no content is provided, an indication that content is unavailable is provided, or alternate content is displayed, among other examples. In another example, the client performs verification aspects locally. For example, a cryptographic package comprising a cryptographic key or signature received by the client device from a publisher is used perform a cryptographic verification of secured content (e.g., as provided directly from a content source, indirectly from a content marketplace, etc.) according to aspects disclosed herein. In examples, the root authority gathers information based on whether the content is displayed (e.g., for analytics, content revisions or targeting changes, etc.), which is made available to publishers and/or content sources, among others. While example verification processes are described herein, it will be appreciated that other information, techniques, or devices may be used to verify a publisher without departing from the spirit of this disclosure.

FIG. 1A illustrates an overview of an example system 100 for content delivery verification. As illustrated, system 100 comprises client device 102, publisher 104, and content source 106. Client device 102 is a computing device, such as a mobile computing device, a tablet computing device, a personal computing device, or a laptop computing device, among other computing devices. Publisher 104 provides articles and/or other primary content for display on client device 102. In some examples, publisher 104 is a website or a mobile or desktop application, among other examples. As described herein, publisher 104 provides supplemental content from content source 106 to client device 102 in conjunction with its articles. According to aspects disclosed herein, supplemental content from content source 106 is provided to publisher 104 by way of content marketplace 108. In an example, content source 106 may be a business, a brand, or an advertising agency, among other content sources. For example, content source 106 may provide supplemental content associated with a product or service offered by content source 106. In some examples, supplemental content is created for an intended audience (e.g., based on age, gender, income level, geolocation region, etc.). While FIG. 1A is described with respect to providing supplemental content via content marketplace 108, it will be appreciated that, in other examples, content is directly provided to publisher 104 by content source 106 or is provided via a variety of other intermediaries, among other examples.

For purposes of illustration, system 100 also comprises fraudulent publisher 112, which masquerades as a legitimate publisher (e.g., publisher 104) or simulates providing supplemental content to a client device (e.g., as may normally be provided by publisher 104 to client device 102), as described above. In an example, fraudulent publisher 112 comprises a data center or a computing device used to fraudulently receive supplemental content from content marketplace 108. In order to provide content delivery verification according to aspects disclosed herein, root authority 110 is used.

In examples, root authority 110 is a computing device or a component of a computing device. In an example, publisher 104 registers with or is otherwise be known by root authority 110. Root authority 110 stores information associated with publisher 104 (e.g., a list of known IP addresses, a public key of a cryptographic key pair, etc.). In another example, root authority 110 provides a token to publisher 104. Publisher 104 may later use the token to verify itself with root authority 110. In some examples, content source 106 provides unsecured supplemental content to root authority 110, as illustrated by arrow 101. Root authority 110 generates secured content based on the supplemental content and provides the secured content to content source 106, which is shown by arrow 103. As an example, generating the secured content comprises encrypting or hashing at least a part of the supplemental content using a cryptographic key (e.g., a symmetric key, an asymmetric key, etc.). In another example, the secured content comprises a reference to at least a part of the supplemental content, which is stored by root authority 110, a storage system (not pictured), or a web server (not pictured), among others. While example techniques have been discussed with respect to generating secured content, it will be appreciated that other techniques may be used to generate secured content without departing from the spirit of this disclosure.

Arrow 105 illustrates that content source 106 provides the secured content to content marketplace 108. In an example, content source 106 indicates that the secured content should be provided for display by a specific publisher (e.g., publisher 104), a specific type of publisher (e.g., a publisher in a certain industry, having a certain target audience, etc.), or to one or more target audiences, among other criteria. Content marketplace 108 enables content source 106 to place one or more bids in order to provide the secured content for display in conjunction with articles of a publisher.

In an example, client device 102 requests an article from publisher 104, as indicated by arrow 107. Accordingly, publisher 104 indicates to content marketplace 108 that an opportunity exists to provide supplemental content from content marketplace 108 to client device 102 in addition to the requested article from publisher 104. In examples, a bid placed by content source 106 is fulfilled (e.g., as a result of bidding higher than other content sources, as a result of determining that publisher 104 and/or client device 102 satisfies certain criteria, etc.). As a result, publisher 104 receives secured content from content marketplace 108 that is associated with content source 106. While examples are described with respect to publisher 104 providing the indication, in other examples, client device may executes instructions provided by publisher 104 that cause client device 102 to communicate with content marketplace 108 in order to retrieve such secured content as may be provided by content source 106.

According to aspects disclosed herein, verification using root authority 110 may occur. In some examples, publisher 104 provides a verification request (arrow 113) to root authority 110, wherein the verification request may comprise at least a part of the secured content. Publisher 104 also provides additional information, such as a cryptographic signature or a token that was provided by root authority 110. Root authority 110 uses the provided information to verify publisher 104 and/or aspects of the content that was received from content marketplace 108. In an example, root authority 110 verifies one or more criteria specified by content source 106 (e.g., that client device 102 is within a target audience, that publisher 104 operates in a specified industry, etc.). If root authority 110 successfully verifies the request, root authority 110 provides a verification response (arrow 115) comprising unsecured content (e.g., supplemental content, as was initially provided to root authority 110 by content source 106) to publisher 104. In another example, root authority 110 provides a cryptographic key that may be used by publisher 104 to decrypt the secured content. It will be appreciated that root authority 110 may use any of a variety of techniques to provide such content after verifying the request.

If, however, the root authority 110 is unable to verify the request, root authority 110 provides a verification response (arrow 115) comprising no content. In another example, root authority 110 provides an indication that the requested content is unavailable or provides alternate content. As an example, alternate content comprise default content (e.g., as may be specified by root authority 110, publisher 104, etc.) or executable content intended to gather additional information (e.g., relating to why the verification failed, relating to publisher 104 and/or client device 102, etc.), among other alternate content. Accordingly, the publisher 104 provides an article response (arrow 117) to client device 102, comprising the requested article and the supplemental content (in the case of successful verification) or no/alternate content (in the case of unsuccessful verification).

In other examples, publisher 104 provides the secured content to client device 102, thereby causing client device 102 to provide a verification request to root authority 110, as indicated by dashed arrow 119. As an example, if publisher 104 comprises a website, publisher 104 may embed executable code in the article provided to client device 102 that, when executed by client device 102, causes client device 102 to perform verification aspects as disclosed herein. Publisher 104 may also provide additional information along with the secured content, such as a cryptographic signature or a token, as was discussed above. The cryptographic signature may be a signature generated by publisher 104 using a private key of a cryptographic key pair, such that the signature may be provided to root authority 110 and validated using a public key of the cryptographic key pair (e.g., which may be known by root authority 110 as a result of publisher 104 registering with root authority 110).

In such an example where the secured content is provided to client device 102, client device 102 may provide a verification request to root authority 110 (dashed arrow 119), which, as discussed above, determines whether to verify the request. If the request is verified, root authority 110 provides supplemental content associated with the secured content (e.g., as may have initially been provided to root authority 110 by content source 106), provides a decryption key to decrypt the secured content, or provides a reference (e.g., a Uniform Resource Locator, a Uniform Unique Identifier, etc.) to supplemental content, among other examples. If the request is not verified, root authority 110 provides no content, provides an indication that the content is unavailable, or provides alternate content, among other examples.

By contrast, if the secured content is instead provided to fraudulent publisher 112 (e.g., as a result of fraudulent publisher 112 masquerading as publisher 104), fraudulent publisher 112 would be unable to complete the verification process for the secured content in order to obtain the content originally provided by content source 106. As an example, fraudulent publisher 112 would not be registered with or otherwise known by root authority 110 (e.g., fraudulent publisher 112 would have a different IP address, may operate using different software, may not be able to provide the correct cryptographic information, etc.). Similarly, if fraudulent publisher 112 were to simulate providing the secured content for display on a client device, the verification process would once again fail, as the simulated display would again be unable to provide the correct or expected information in order to cause root authority 110 to provide the content.

As a result, content source 106 may be assured that content provided to content marketplace 108 is displayed by specified publishers and/or to target audiences (e.g., client device 102). In an example, content source 106 may only pay for content that is actually rendered, and, as a result, when secured content fails to be verified by root authority 110 (e.g., as may be the case when the content is provided to fraudulent publisher 112), the content may not be displayed, thereby preventing content source 106 from paying for fraudulent publishers. Accordingly, aspects of the present invention provide improved security for at least content source 106, content marketplace 108, publisher 104, and client device 102, as it may not only be possible to verify that content is displayed to a specified audience, but it may also be possible to prevent the display of content by fraudulent publishers and to verify and/or audit the devices on which such content is displayed. It will be appreciated that while example quantities have been provided with respect to FIG. 1, other examples may comprise fewer or additional client devices, publishers, content marketplaces, content sources, root authorities, and/or fraudulent publishers.

Figure 1B:
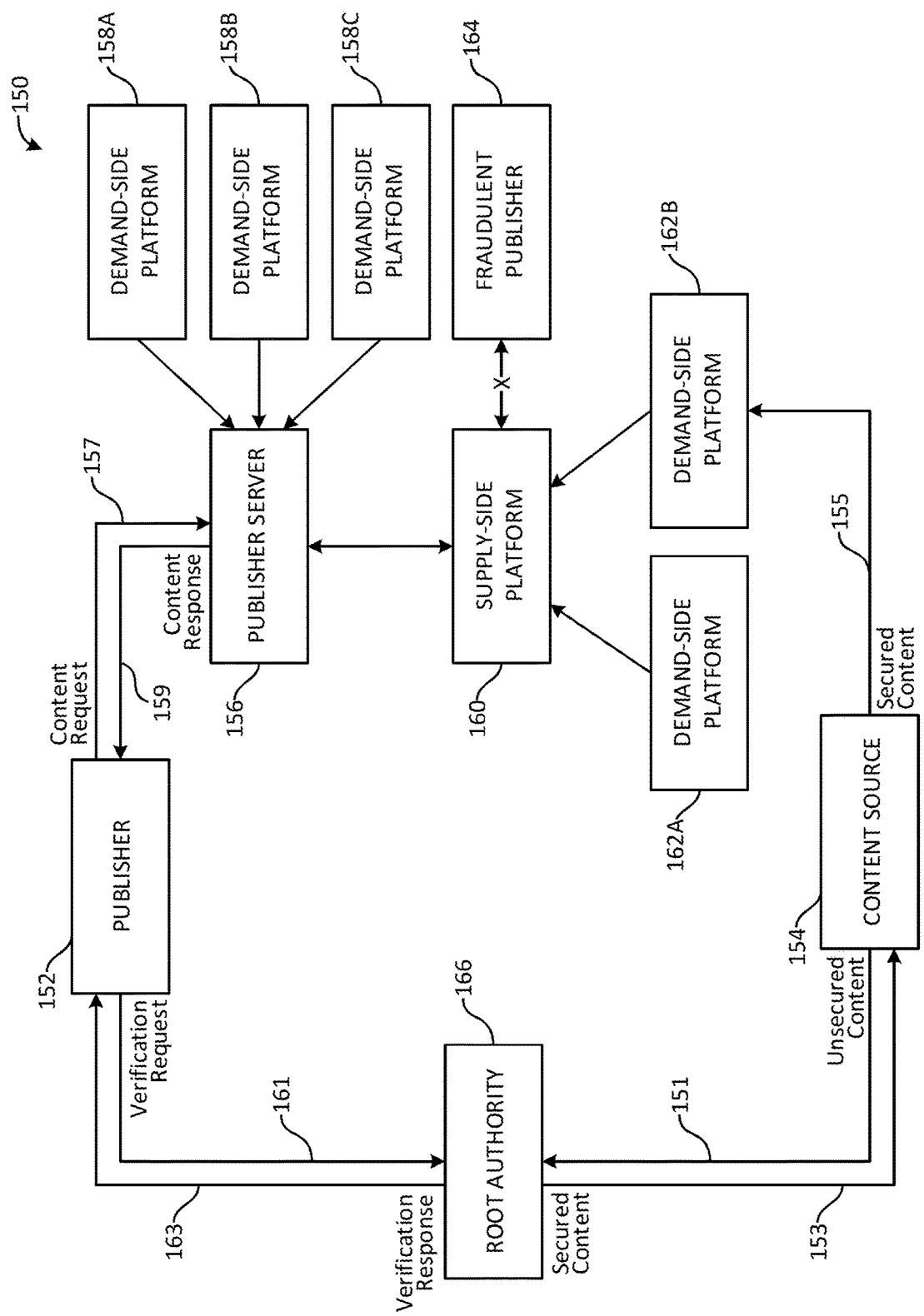
FIG. 1B illustrates an overview of a further example system for content delivery verification, further showing specific aspects of a content marketplace.

FIG. 1B illustrates an overview of a further example system 150 for content delivery verification. As illustrated, system 150 comprises publisher 152 and content source 154. Similar to FIG. 1A, content source 154 may provide supplemental content to publisher 152 for delivery and ultimately for display (e.g., on a client device, such as client device 102 in FIG. 1A). When publisher 152 receives a request for an article, publisher 152 provides an indication to publisher server 156 (arrow 157), in order to determine whether there is supplemental content (e.g., as may be provided by content source 154) that may be provided in conjunction with the requested article. It will be appreciated that an article is used as an example of primary content that may be provided by a publisher, and that the aspects described herein are not so limited. In some examples, publisher server 156 communicates with one or more of demand-side platforms 158A-158C to provide an indication that supplemental content may be displayed by publisher 152. In response, one of demand-side platforms 158A-158C provides supplemental content to publisher server 156. In other examples, publisher server 156 communicates with supply-side platform 160 to provide an indication that supplemental content may be displayed by publisher 152 in response to an article request (e.g., that there is supply available on which one or more content sources may bid).

Content source 154 provides supplemental content (e.g., unsecured content or, according to aspects disclosed herein, secured content as illustrated by arrow 155, which may be generated by root authority 166 as indicated by arrows 151 and 153) to one or more of demand-side platforms 162A-162B, which may bid on behalf of content source 154. As a result of winning a bid, supplemental content of content source 154 is ultimately provided to publisher 152 by way of demand-side platform 162B, supply-side platform 160, and publisher server 156. However, as illustrated, the relationship between content source 154 and publisher 152 is attenuated by way of publisher server 156, supply-side platform 160, and demand-side platform 162B, such that it is difficult for content source 154 to verify the display of its supplemental content by publisher 152.

In some examples, fraudulent publisher 164 provides an indication to supply-side platform 160 that it has an opportunity to display supplemental content, similar to the indication that was provided on behalf of publisher 152 by publisher server 156. As a result, content source 154 may win a bid to display supplemental content in conjunction with an article of fraudulent publisher 164 (e.g., via demand-side platform 162B and supply-side platform 160), even though fraudulent publisher 164 may not satisfy one or more criteria specified by content source 154 (e.g., that the supplemental content should be targeted toward a certain audience or displayed by publishers in a certain industry, etc.). In fact, fraudulent publisher 164 may masquerade as publisher 152, such that supplemental content that content source 154 intends for display by publisher 152 is, in actuality, displayed by fraudulent publisher 164. For example, if publisher 152 is a sports news website, fraudulent publisher 164 may masquerade as the same sports news website, such that it appears to supply-side platform 160, demand-side platform 162B, and, by extension, content source 154 that the supplemental content was actually provided to publisher 152. As a result, content source 154 will have paid to provide its supplemental content to a publisher to which it did not intend.

Aspects herein remedy this issue by using root authority 166 to provide content delivery verification. In examples, root authority 166 is a computing device or a component of a computing device. In an example, publisher 152 registers with or is otherwise known by root authority 166. Root authority 166 stores information associated with publisher 152 (e.g., a list of known IP addresses, a public key of a cryptographic key pair, etc.). In another example, root authority 166 provides a token to publisher 152. Publisher 152 later uses the token to verify itself with root authority 166. In some examples, content source 154 provides supplemental content to root authority 166, as indicated by arrow 151. Root authority 166 generates secured content based on the supplemental content and provides the secured content to content source 154 (arrow 153). As an example, generating the secured content comprises encrypting at least a part of the supplemental content using a cryptographic key (e.g., a symmetric key, an asymmetric key, etc.). In another example, the secured content comprises a reference to at least a part of the supplemental content, which is stored by root authority 166 or a storage system (not pictured). While example techniques have been discussed with respect to generating secured content, it will be appreciated that other techniques may be used to generate secured content without departing from the spirit of this disclosure.

Arrow 155 illustrates that content source 154 provides the secured content to demand-side platform 162B. In an example, content source 154 indicates that the secured content should be provided for display by a specific publisher (e.g., publisher 152), a specific type of publisher (e.g., a publisher in a certain industry, having a certain target audience, etc.), or to one or more target audiences, among other criteria. Demand-side platform 162B enables content source 154 to place one or more bids in order to provide the secured content for display in conjunction with articles of a publisher.

In an example, a client device (not pictured) requests an article from publisher 152. Publisher 152 provides an indication to publisher server 156 that an opportunity exists to provide supplemental content to the client device in addition to the requested article from publisher 152. Accordingly, publisher server 156 provides an indication to supply-side platform 160, which causes a bid placed by demand-side platform 162B on behalf of content source 154 to be fulfilled (e.g., as a result of bidding higher than other content sources, as a result of determining that publisher 152 and/or the client device satisfies certain criteria, etc.). As a result, publisher 152 receives secured content (arrow 159) from content source 154 via supply-side platform 160 and demand-side platform 162B.

According to aspects disclosed herein, verification using root authority 166 may occur. In some examples, publisher 152 provides a verification request (arrow 161) to root authority 166, wherein the verification request may comprise at least a part of the secured content. Publisher 152 may also provide additional information, such as a cryptographic signature or a token that was provided by root authority 166. Root authority 166 uses the provided information to verify publisher 152 and/or aspects of the content. In an example, root authority 166 verifies one or more criteria specified by content source 154 (e.g., that the client device is within a target audience, that publisher 152 operates in a specified industry, etc.). If root authority 166 successfully verifies the request, root authority 166 provides a verification response (arrow 163) comprising at least a part of the unsecured content (e.g., supplemental content, as was initially provided to root authority 166 by content source 154) to publisher 152. In another example, root authority 166 provides a cryptographic key that may be used by publisher 152 to decrypt the secured content. It will be appreciated that root authority 166 may use any of a variety of techniques to provide access to such content after verifying the request.

If, however, the root authority 166 is unable to verify the request, root authority 166 provides a verification response (arrow 163) comprising no content. In another example, root authority 166 provides an indication that the requested content is unavailable, or may provide alternate content. As an example, alternate content comprises default content (e.g., as may be specified by root authority 166, publisher 152, etc.) or executable content intended to gather additional information (e.g., relating to why the verification failed, relating to publisher 152 and/or the client device, etc.), among other alternate content. Accordingly, the publisher 152 provides an article response to the client device, comprising the requested article and the supplemental content (in the case of successful verification) or no/alternate content (in the case of unsuccessful verification).

In other examples, publisher 152 may provide the secured content to the client device, thereby causing the client device to provide a verification request to root authority 166. As an example, if publisher 152 comprises a website, publisher 152 may embed executable code in the article provided to the client device that, when executed by the client device, causes the client device to perform verification aspects as disclosed herein. Publisher 152 may also provide additional information along with the secured content, such as a cryptographic signature or a token, as was discussed above. The cryptographic signature may be a signature generated by publisher 152 using a private key of a cryptographic key pair, such that the signature may be provided to root authority 166 and validated using a public key of the cryptographic key pair (e.g., which may be known by root authority 166 as a result of publisher 152 registering with root authority 166).

In such an example where the secured content is provided to the client device, the client device may provide a verification request to root authority 166, which, as discussed above, determines whether to verify the request. If the request is verified, root authority 166 provides at least a part of the supplemental content associated with the secured content (e.g., as may have initially been provided to root authority 166 by content source 154), provides a decryption key to decrypt the secured content, or provides a reference to the content, among other examples. If the request is not verified, root authority 166 provides no content, provides an indication that the content is unavailable, or provides alternate content, among other examples.

By contrast, if the secured content is instead provided to fraudulent publisher 164 (e.g., as a result of fraudulent publisher 164 masquerading as publisher 152), fraudulent publisher 164 would be unable to complete the verification process for the secured content in order to obtain the content originally provided by content source 154. As an example, fraudulent publisher 164 would not be registered with or otherwise known by root authority 166 (e.g., fraudulent publisher 164 would have a different IP address, may operate using different software, may not be able to provide the correct cryptographic information, etc.). Similarly, if fraudulent publisher 164 were to simulate providing the secured content for display on a client device, the verification process would once again fail, as the simulated display would again be unable to provide the correct or expected information in order to cause root authority 166 to provide the content.

As a result, content source 154 may be assured that content provided to demand-side platform 162B is displayed by specified publishers and/or to target audiences. In an example, content source 154 may only pay for content that is actually rendered, and, as a result, when secured content fails to be verified by root authority 166 as described above (e.g., as may be the case when the content is provided to fraudulent publisher 164), the content may not be displayed, thereby preventing content source 154 from paying for fraudulent publishers. Accordingly, aspects of the present invention provide improved security for at least content source 154, publisher 152, and client devices interacting with publisher 152, as it may not only be possible to verify that content is displayed to a specified audience, but it may also be possible to prevent the display of content by fraudulent publishers and to verify and/or audit the devices on which such content is displayed. It will be appreciated that while example quantities have been provided with respect to FIG. 1B, other examples may comprise fewer or additional entities 152-164.

Figure 2A:
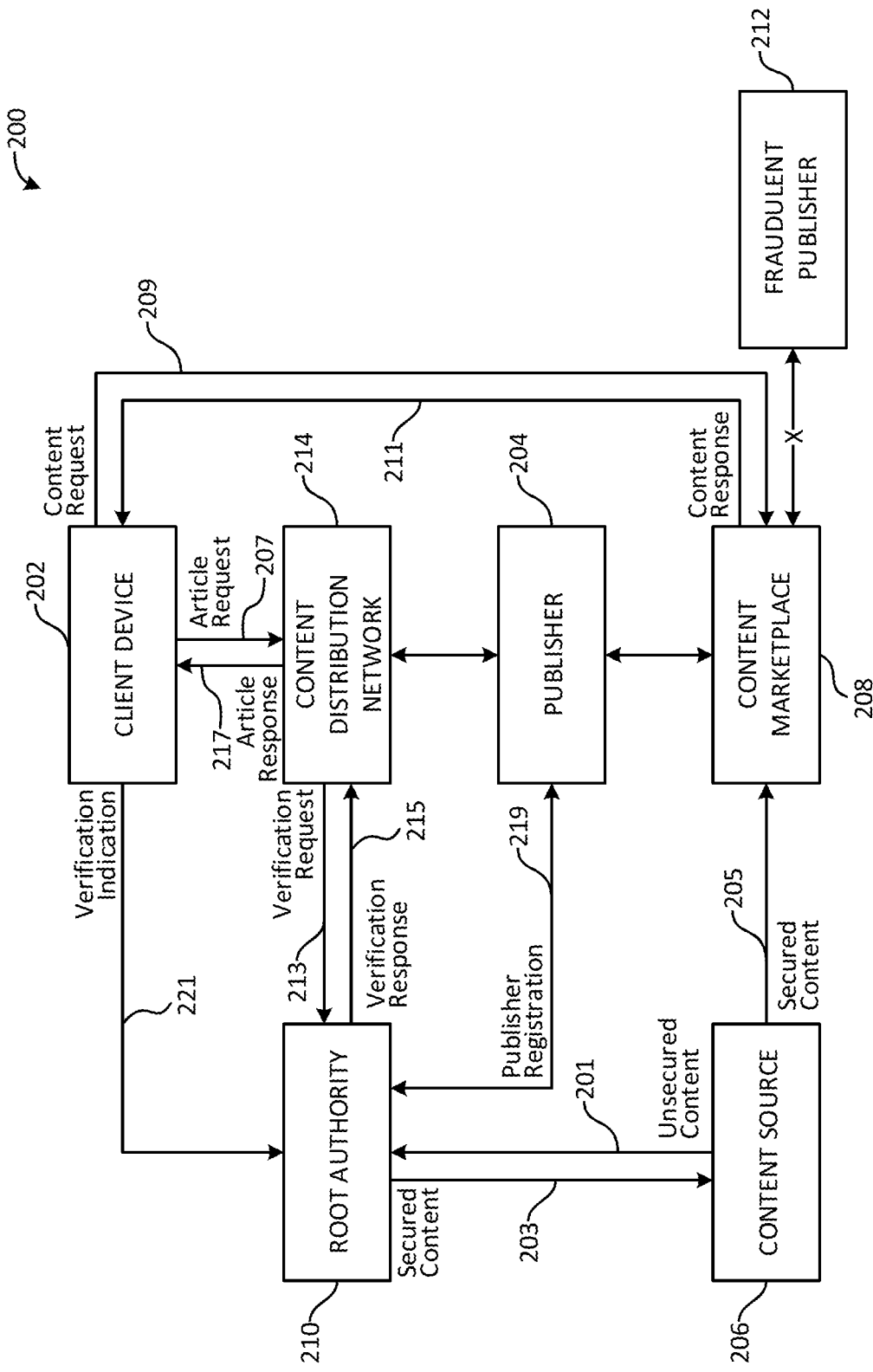
FIG. 2A illustrates an overview of another example system for content delivery verification, illustrating a root authority in conjunction with a content distribution network, publisher, content marketplace, and content source.

FIG. 2A illustrates an overview of another example system 200 for content delivery verification. As illustrated, system 200 comprises client device 202, publisher 204, and content source 206. Client device 202 is a computing device, such as a mobile computing device, a tablet computing device, a personal computing device, or a laptop computing device, among other computing devices. As described herein, publisher 204 provides articles and/or other primary content for display on client device 202. In some examples, publisher 204 is a website or a mobile or desktop application, among other examples. In examples, supplemental content from content source 206 is displayed on client device 202 in combination with articles from publisher 204. For example, content source 206 provides one or more images, video, text, and/or other supplemental content for display. According to aspects disclosed herein, supplemental content from content source 206 is provided to publisher 204 indirectly by way of content marketplace 208 or is provided directly to publisher 204 and/or client device 202, among other examples. In an example, content source 206 provides a variety of other supplemental content, including, but not limited to, an embeddable web plugin (e.g., a media player, a slide show player, etc.), downloadable content, targeted content, etc. While example system 200 is described with respect to different supplemental content as compared to FIGS. 1A-1B and other examples, it will be appreciated that any of a wide variety of supplemental content may be used in conjunction with the aspects of the present disclosure. Further, while FIG. 2A illustrates content source 206 as providing content via content marketplace 208, it will be appreciated that, in other examples, content is directly provided by content source 206 to publisher 204, is directly provided to client device 202 by content source 206, or is provided via any of a variety of other intermediaries, among other examples.

System 200 is illustrated as comprising content distribution network 214, which is used by publisher 204 to distribute content. As an example, content distribution network 214 comprises one or more computing devices, which may be used to distribute content to client devices such as client device 202. In some examples, computing devices of content distribution network 214 are geographically dispersed so as to improve latency between geographically diverse client devices and the computing devices of content distribution network 214. For example, content distribution network 214 caches or otherwise stores content from publisher 204, such that requests for content from publisher 204 by client device 202 are processed by content distribution network 214.

For purposes of illustration, system 200 also illustrates fraudulent publisher 212, which masquerades as a legitimate publisher (e.g., publisher 204) or simulate providing supplemental content to a client device (e.g., as may normally be provided by publisher 204 to client device 202), as described above. In an example, fraudulent publisher 212 comprises a data center or a computing device used to fraudulently receive supplemental content via content marketplace 208. While fraudulent publisher is illustrated as accessing content from content source 206 via content marketplace 208, it will be appreciated that other examples comprise accessing such content via content distribution network 214, among other examples. In order to provide content delivery verification according to aspects disclosed herein, root authority 210 is used.

In examples, root authority 210 is a computing device or a component of a computing device. In an example, publisher 204 registers with or is otherwise known by root authority 210, as illustrated by arrow 219 between publisher 204 and root authority 210. For example, root authority 210 stores information associated with publisher 204, including, but not limited to, a list of known IP addresses associated with publisher 204 and/or content distribution network 214, one or more cryptographic keys (e.g., symmetric keys, one or more keys of an asymmetric cryptographic key pair, etc.), an industry or other affiliation with a group of one or more other publishers, etc. In another example, root authority 210 generates a cryptographic key that is associated with publisher 204, which is used to cryptographically sign or encrypt content of publisher 204 and/or content of content source 206.

For example, client device 202 requests an article of publisher 204. In examples, the request is received by content distribution network 214 (as illustrated by arrow 207), which, in turn, responds to the request based on cached articles from publisher 204. In some examples, content distribution network 214 does not have a cached copy of the requested article, and instead generates an origin server request to publisher 204 to retrieve and cache the requested article. In examples, upon receiving the request, content distribution network 214 communicates with root authority 210, as illustrated by arrow 213 between root authority 210 and content distribution network 214.

As an example, content distribution network 214 provides root authority 210 with information associated with the request received from client device 202, including, but not limited to, a geographic location associated with client device 202, an IP address, one or more cookies (e.g., associated with a session of client device 202 with publisher 204 and/or content distribution network 214, etc.), a user agent, and/or identifying information associated with the article (e.g., a globally unique identifier (GUID), a cryptographic hash or field, at least a part of the article, etc.). Accordingly, root authority 210 generates a cryptographic package based on at least a part of the information received from content distribution network 214 and based on known information for publisher 204.

In examples, the cryptographic package comprises a cryptographic signature useable to verify the integrity of the article, which may be generated by cryptographically signing a hash or at least a part of the article, among other examples, using a cryptographic key associated with publisher 204 (e.g., as may have been generated and/or stored as a result of publisher 204 registering or otherwise being known to root authority 210). In some examples, the cryptographic package comprises executable instructions useable by a client device (e.g., client device 202) to verify the integrity of the article (e.g., using a cryptographic signature as described above, by generating a request to root authority 210, by computing a checksum or nonce, etc.). For example, the executable instructions may be executed by the client device prior to, during, or after processing the article in order to generate a cryptographic signature of the received supplemental content, which is compared to the cryptographic signature of the cryptographic package, as was been generated by root authority 210 as described above. While examples herein are described with respect to performing verification based on a cryptographic signature, it will be appreciated that one or more other cryptographic fields may be used and/or other information may be contained in the cryptographic package and used to verify the article.

Root authority 210 provides the generated cryptographic package to content distribution network 214 (arrow 215), which, in turn, responds to the request received from client device 202 (arrow 217) with the article from publisher 204 (e.g., as may have been cached by content distribution network 214, retrieved via an origin server request, etc.) and the cryptographic package generated by root authority 210. Accordingly, client device 202 generates a display of the received article, and uses the cryptographic package to verify the integrity of the article as described herein.

In an example, when client device 202 generates the display of the received article, supplemental content is indicated for inclusion in the generated display. For example, the article comprises one or more references (e.g., uniform resource locators (URLs), uniform resource identifiers (URIs), "script" HTML tags, content placeholders, etc.) to such supplemental content, which is used by client device 202 to access such supplemental content. For example, arrow 209 illustrates client device 202 communicating with content marketplace 208 to access supplemental content when generating the display of the article. It will be appreciated that, in some examples, supplemental content may be accessed directly from a content source or from another content distribution network, among other examples. In other examples, at least some of the supplemental content is included with the article by content distribution network 214 and/or publisher 204. In examples, the supplemental content is secured content that was generated at least in part by root authority 210.

As described herein, root authority 210 processes supplemental content from content source 206 to generate secured content (arrows 201 and 203), that is ultimately made available to client device 202 via content marketplace 208, such as when content source 206 provides the secured content to content marketplace 208 (arrow 205). In some examples, content source 206 provides an indication to root authority 210 regarding one or more publishers by which its supplemental content may be displayed, a group of publishers associated with one or more relevant industries, etc. As such, root authority 210 generates secured content based on the supplemental content by encrypting, hashing, or otherwise cryptographically processing the supplemental content based on one or more cryptographic keys associated with the indicated publishers. For example, secured content may comprise a cryptographic signature for the content based on a cryptographic key associated with publisher 204, in combination with an encrypted or unencrypted representation of the content. Accordingly, when client device 202 ultimately receives the secured content via content marketplace 208, the previously received cryptographic package from content distribution network 214 is used by client device 202 to verify the secured content.

In some examples, a verification indication as to the verification result is provided to root authority 210, as illustrated by arrow 221 between client device 202 and root authority 210. The indication enables a publisher, content source, or other entity to verify and/or audit the devices and/or publishers on which supplemental content is displayed. For example, if content source 206 paid for its supplemental content to be provided to client device 202 via content marketplace 208 for display in combination with an article from publisher 204, content source 206 is able to use such indications to verify that its supplemental content was displayed accordingly, and was not instead displayed with an article from fraudulent publisher 212. As a result, content source 206 need not pay for fraudulent impressions. Further, such indications may be used by root authority 210 to gather information relating to fraudulent publishers (e.g., when verification is not successful), which are usable to identify such fraudulent publishers, implement additional mitigation techniques, and provide relevant data to content sources and/or publishers, among other uses.

Figure 2B:
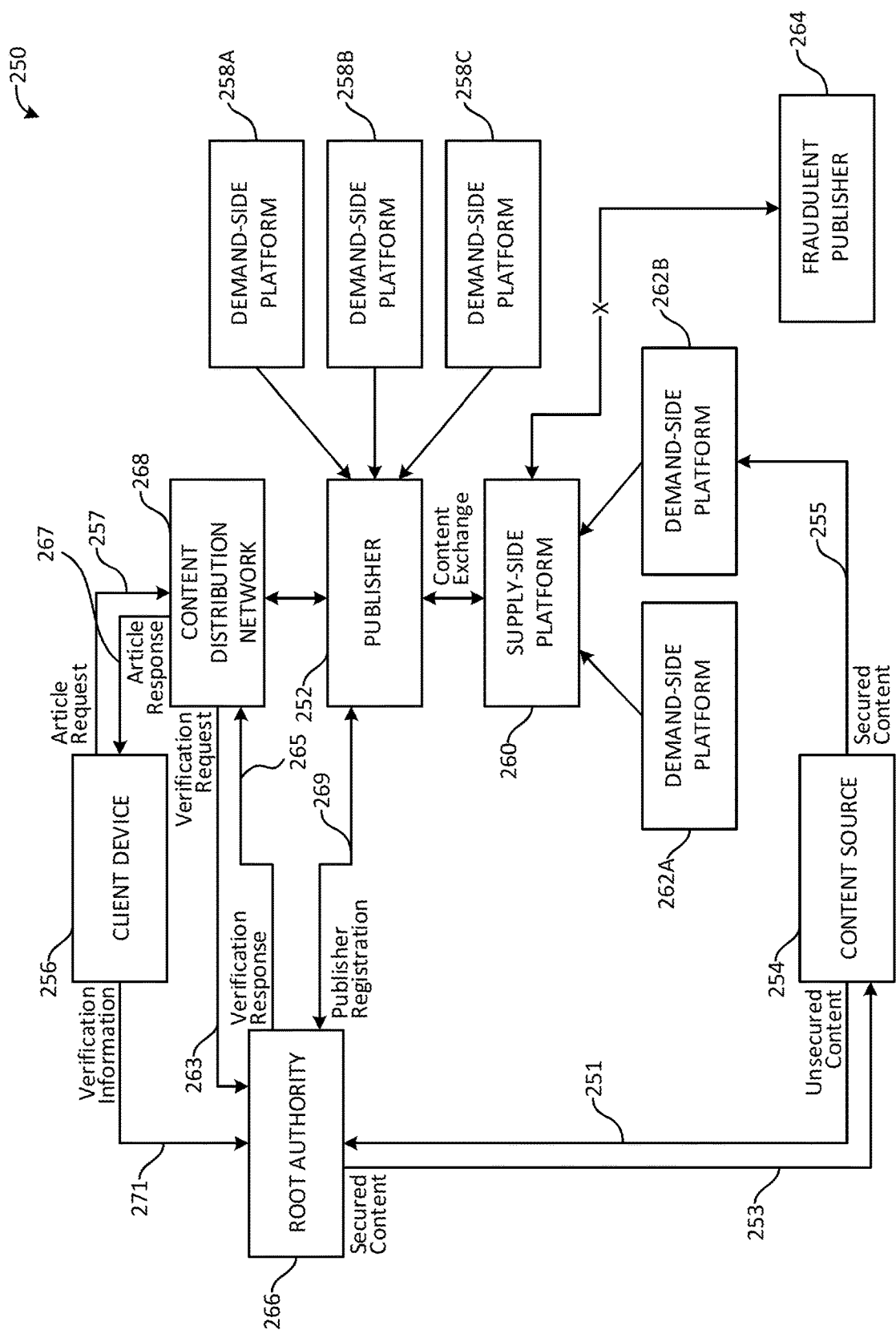
FIG. 2B illustrates an overview of a further example system for content delivery verification, further showing specific aspects of a content marketplace in conjunction with a content distribution network.

FIG. 2B illustrates an overview of a further example system 250 for content delivery verification. As illustrated, system 250 comprises client device 256, content distribution network 268, publisher 252, and content source 254. Similar to FIG. 2A, content source 254 may indirectly provide supplemental content to publisher 252 for delivery and ultimately for display (e.g., on a client device, such as client device 256). In examples, when content distribution network 268 receives a request for an article on behalf of publisher 252 (e.g., by a client device), publisher 252 and/or content distribution network 268 communicate with one or more of demand-side platforms 258A-258C to provide an indication that supplemental content may be displayed. In response, one of demand-side platforms 258A-258C provide supplemental content to publisher 252. In other examples, publisher 252 communicates with supply-side platform 260 to provide an indication that supplemental content may be displayed by publisher 252 in response to an article request, such as is indicated by arrow 257 (e.g., that there is supply available on which one or more content sources may bid). It will be appreciated that, in other examples, content distribution network 268 communicates with demand-side platforms 258A-258C and/or supply-side platform 260.

Content source 254 provides supplemental content to one or more of demand-side platforms 262A-262B, which may bid on behalf of content source 254. In examples, the content is secured content as illustrated by arrow 255, which may be generated by root authority 266 as indicated by arrows 251 and 253. As a result of winning a bid, supplemental content of content source 254 is ultimately provided to publisher 252 by way of demand-side platform 262B and supply-side platform 260. However, as illustrated, the relationship between content source 254 and publisher 252 is attenuated by way of publisher 252, supply-side platform 260, and demand-side platform 262B, such that it is difficult for content source 254 to verify the display of its supplemental content by publisher 252.

Aspects herein remedy this issue by using root authority 266 to provide content delivery verification. In examples, root authority 266 is a computing device or a component of a computing device. In an example, publisher 252 registers with or is otherwise known by root authority 266, as illustrated by arrow 269 between publisher 252 and root authority 266. For example, root authority 266 stores information associated with publisher 252, including, but not limited to, a list of known IP addresses associated with publisher 252 and/or content distribution network 268, one or more cryptographic keys (e.g., symmetric keys, one or more keys of an asymmetric cryptographic key pair, etc.), an industry or other affiliation with a group of one or more other publishers, etc. In another example, root authority 266 generates a cryptographic key that is associated with publisher 252, which is used to cryptographically sign or encrypt content of publisher 252 and/or content of content source 254.

For example, client device 256 may request an article associated with publisher 252. In examples, the request is received by content distribution network 268 (as illustrated by arrow 257), which, in turn, responds to the request based on cached articles from publisher 252. In some examples, content distribution network 268 does not have a cached copy of the article, and instead generates an origin server request to publisher 252 to retrieve and cache the requested article. In examples, upon receiving the request, content distribution network 268 communicates with root authority 266, as illustrated arrow 263 between root authority 266 and content distribution network 268.

As an example, content distribution network 268 provides root authority 266 with information associated with the request received from client device 256, including, but not limited to, a geographic location associated with client device 256, an IP address, one or more cookies (e.g., associated with a session of client device 256 with publisher 252 and/or content distribution network 268, etc.), a user agent, and/or identifying information associated with the article (e.g., a globally unique identifier (GUID), a cryptographic hash or field, at least a part of the article, etc.). Accordingly, root authority 266 generates a cryptographic package based on at least a part of the information received from content distribution network 268 and based on known information for publisher 252.

In examples, the cryptographic package may comprise a cryptographic signature or other field useable to verify the integrity of the article, which may be generated by cryptographically signing a hash or at least a part of the article, among other examples, using a cryptographic key associated with publisher 252 (e.g., as may have been generated and/or stored as a result of publisher 252 registering or otherwise being known to root authority 266). In some examples, the cryptographic package may comprise executable instructions useable by a client device (e.g., client device 256) to verify the integrity of the article (e.g., using a cryptographic signature as described above, by generating a request to root authority 266, by computing a checksum or nonce, etc.). For example, the executable instructions may be executed by the client device prior to, during, or after processing the article in order to generate a cryptographic signature of the received supplemental content, which may be compared to the cryptographic signature of the cryptographic package, as may have been generated by root authority 266 as described above. While examples herein are described with respect to performing verification based on a cryptographic signature, it will be appreciated that other information may be contained in the cryptographic package and used to verify the article.

Root authority 266 provides the generated cryptographic package to content distribution network 268 (arrow 265), which, in turn, responds to the request received from client device 256 (arrow 267) with the article from publisher 252 (e.g., as may have been cached by content distribution network 268, retrieved via an origin server request, etc.) and the cryptographic package generated by root authority 266. Accordingly, client device 256 may generate a display of the received article, and may use the cryptographic package to verify the integrity of the article as described herein.

As described herein, root authority 266 processes supplemental content from content source 254 to generate secured content (arrows 251 and 253), which may be made available to publisher 252 for incorporation with the requested for display by client device 256 via demand-side platform 262B. In some examples, content source 254 provides an indication to root authority 266 regarding one or more publishers by which its content may be displayed, a group of publishers associated with one or more relevant industries, etc. As such, the secured content is encrypted, hashed, or otherwise cryptographically processed based on one or more cryptographic keys associated with the indicated publishers. For example, secured content may comprise a cryptographic signature for the content based on a cryptographic key associated with publisher 252, in combination with an encrypted or unencrypted representation of the supplemental content. Accordingly, when client device 256 ultimately receives the secured content (e.g., via demand-side platform 262B, supply-side platform 260, publisher 252, and content distribution network 268), the previously received cryptographic package from content distribution network 268 may be used by client device 256 to verify the secured content.

In some examples, a verification indication as to the verification result may be provided to root authority 266, as illustrated by arrow 271 between client device 256 and root authority 266. The indication enables a publisher, content source, or other entity to verify and/or audit the devices and/or publishers on which supplemental content is displayed. For example, if content source 254 paid for its supplemental content to be provided for display in conjunction with the article from publisher 252 on client device 256, content source 254 is able to use such indications to verify that its content was displayed accordingly, and was not instead displayed with an article from fraudulent publisher 264. As a result, content source 254 need not pay for fraudulent impressions. Further, such indications may be used by root authority 266 to gather information relating to fraudulent publishers (e.g., when verification is not successful), which may be used to identify such fraudulent publishers, implement additional mitigation techniques, and provide relevant data to content sources and/or publishers, among other uses.

Figure 3:
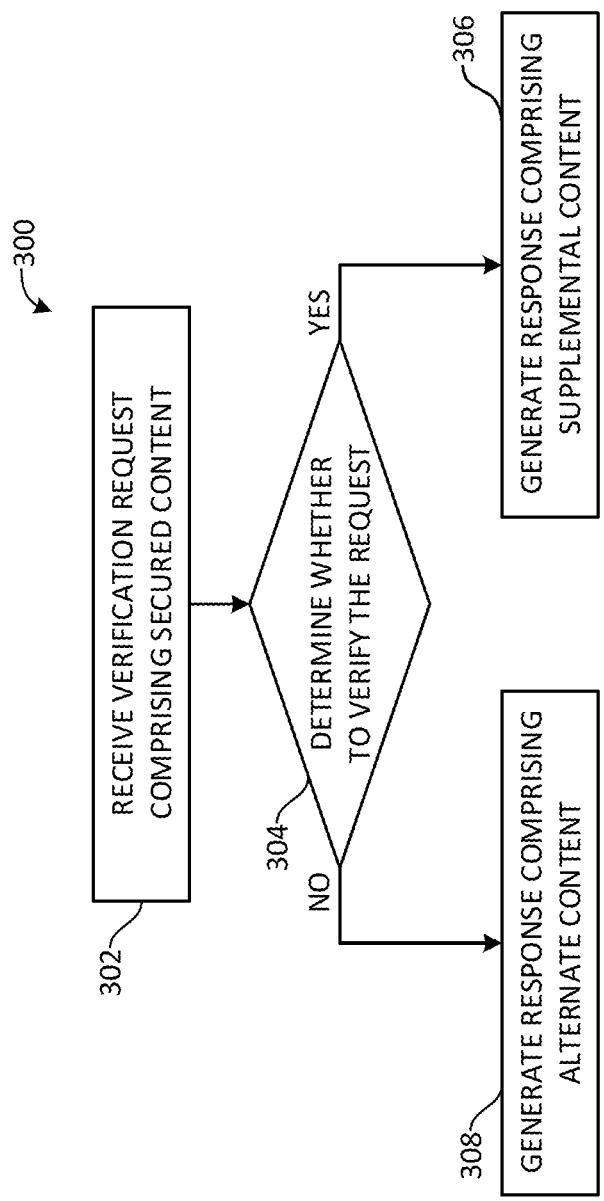
FIG. 3 illustrates an overview of an example method for content delivery verification to determine whether to provide alternate content or supplemental content.

FIG. 3 illustrates an overview of an example method 300 for content delivery verification to determine whether to provide alternate content or supplemental content. In an example, method 300 is performed by a root authority as described herein. Method 300 begins at operation 302, where a verification request is received. The verification request may comprise secured content and, in some examples, additional information such as a cryptographic key or a token. In an example, the request is received from a client device (e.g., client device 102 in FIG. 1A), a publisher (e.g., publisher 104 or publisher 152 in FIGS. 1A and 1B, respectively), or a content distribution network (e.g., content distribution network 214 or content distribution network 268 in FIGS. 2A and 2B, respectively).

At determination 304, it is determined whether the request should be verified. The determination comprises evaluating the received secured content. As an example, the secured content comprises a reference to supplemental content stored by the root authority or by a storage system, as may have been received from a content source. The supplemental content may be associated with information that may be evaluated, such as a list of IP addresses for a publisher, hardware or software information, etc. As a result, the information is compared to the information received from the requestor to determine whether the request should be verified.

In some examples, additional information is also evaluated. If the additional information comprises a cryptographic signature (e.g., as may have been generated using a private key of a cryptographic key pair), the signature is validated using the public key of the cryptographic key pair. In another example, if the additional information comprises a token (e.g., as may have been provided by the root authority), the token is evaluated to determine whether the token is valid. While example verification techniques are disclosed herein, it will be appreciated that other verification techniques may be used without departing from the spirit of this disclosure.

If, at determination 304, it is determined to verify the request, flow branches "YES" to operation 306, where a response to the verification request is generated. In an example, the response comprises at least a part of the supplemental content associated with the secured content. In another example, the response may comprise a cryptographic key that may be used by the requestor to decrypt the secured content, thereby accessing the supplemental content. In some examples, the response may comprise a reference to the supplemental content useable by the requestor to access the supplemental content. It will be appreciated that such content may be provided using any of a variety of other techniques. Flow terminates at operation 306.

If, however, it is determined at determination 304 not to verify the request, flow branches "NO" to operation 308, where a response is generated comprising alternate content. As described herein, alternate content may comprise default content (e.g., as may be specified by a root authority, a publisher, etc.) or content intended to gather additional information (e.g., relating to why the verification failed, relating to a requestor such as a publisher or client device, etc.), among other examples. Flow terminates at operation 308.

Figure 4:
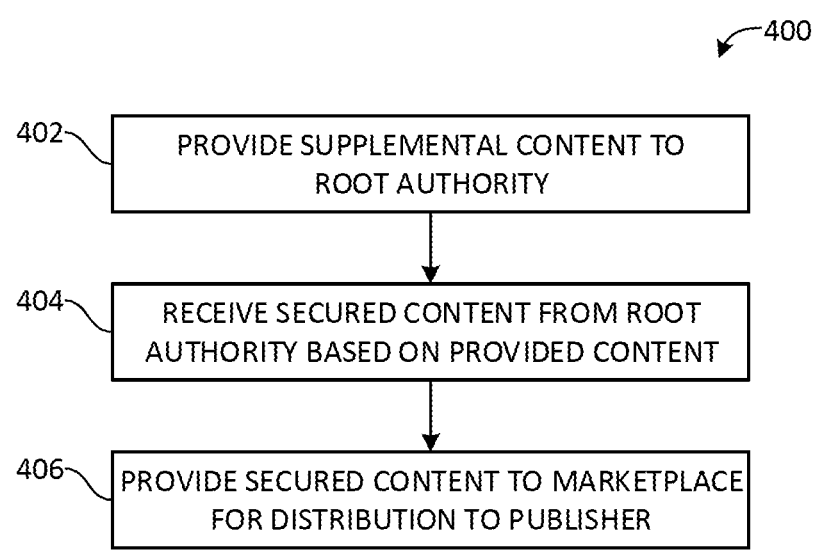
FIG. 4 illustrates an overview of an example method for generating secured content based on supplemental content to provide aspects of content delivery verification.

FIG. 4 illustrates an overview of an example method 400 for generating secured content based on supplemental content to provide aspects of content delivery verification. In an example, method 400 is performed by a content source, such as content source 106 or content source 154 in FIGS. 1A and 1B, respectively. Method 400 begins at operation 402, where supplemental content may be provided to a root authority. In another example, the content is associated with a product or service offered by a content source, may comprise image, video, or text content, or may be any of a variety of other types of content. In some examples, the supplemental content may be intended for display to one or more target audiences, by providers associated with a certain industry, among other criteria.

Moving to operation 404, secured content is received from the root authority in response, wherein the secured content may be based on the supplemental content that was provided at operation 402. As an example, the secured content comprises at least a part of the supplemental content that has been encrypted. In another example, the secured content comprises a reference to the supplemental content, which may later be used by the root authority, a publisher, or a client device to retrieve the content. In other examples, the secured content comprises a cryptographic hash, signature, or other field, which is useable to verify that the secured content is provided to the correct publisher(s) (e.g., when provided to a root authority by a client device, when evaluated by a cryptographic package, etc.). It will be appreciated that secured content may comprise any of a variety of information associated with the provided supplemental content.

At operation 406, the secured content is provided to a content marketplace (e.g., content marketplace 108 in FIG. 1) for distribution to one or more publishers. In an example, the secured content is associated with a bid (e.g., a cost the content source is willing to pay per click, per view, etc.) and/or target criteria (e.g., a target audience, industry, etc.). In some examples, providing the secured content is performed in a similar manner as would ordinarily be performed by a content source when providing unsecured content. While method 400 is described with respect to providing the secured content to a marketplace, it will be appreciated that, in other examples, the secured content is provided directly to the publisher or additional or alternative intermediaries may be used. Flow terminates at operation 406.

Figure 5:
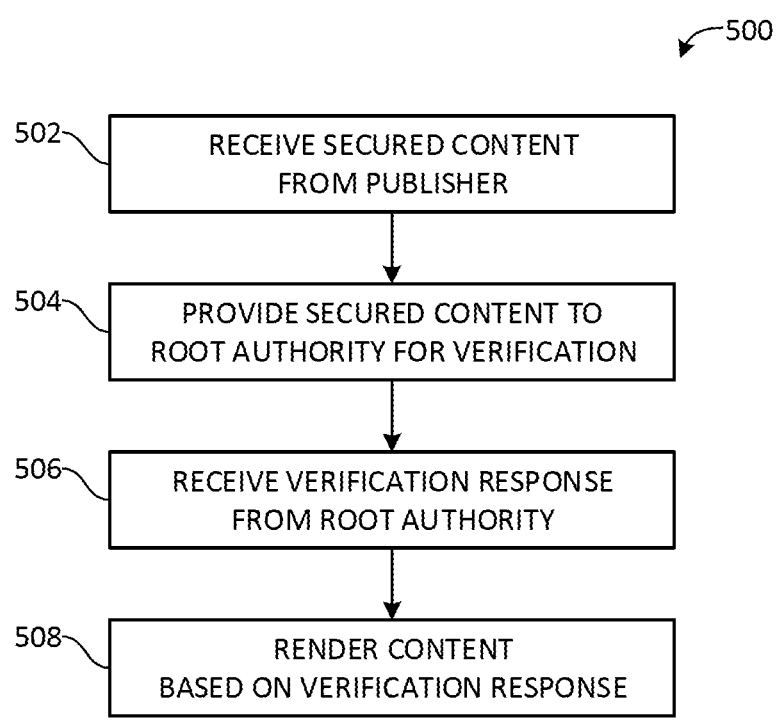
FIG. 5 illustrates an overview of an example method for performing content delivery verification at a client device.

FIG. 5 illustrates an overview of an example method 500 for performing content delivery verification at a client device, such as client device 102 in FIG. 1. Method 500 begins at operation 502, where secured content is received from a publisher. The secured content may be received from a publisher as part of a response to a request for an article. As an example, the request for the article may have been for a webpage from a website associated with or made available by the publisher. In another example, the secured content may be received from a content distribution network as described herein.

Moving to operation 504, at least a part of the secured content is provided to a root authority for verification. In an example, this may comprise a verification request, wherein transmitting the verification request occurs as a result of the client device executing instructions that were received as part of the content from the publisher. In some examples, additional information may be provided in addition to the secured content, such as a cryptographic key or token, among other examples.

At operation 506, a verification response is received from the root authority. The verification response may have been generated according to aspects disclosed herein, such as by performing aspects of method 300 in FIG. 3. In some examples, the verification response comprises at least a part of supplemental content originally provided to the root authority by a content source, or may comprise a cryptographic key useable to decrypt the secured content. In other examples, the verification response comprises a reference to supplemental content, as may be stored by the root authority or a storage system, among other examples. If, however, the secured content was not verified by the root authority, the verification response may comprise alternate content, such as default content or content intended to gather additional information about the publisher or the client device, among other content.

Moving to operation 508, content is rendered based on the received verification response. If supplemental content associated with the content source was received or made accessible at operation 506, the supplemental content may be rendered. In some examples, the supplemental content may be rendered or displayed in conjunction with the article that was received from the publisher. If, however, alternate content was received at operation 506, the alternate content may be rendered for display in conjunction with the article. Flow terminates at operation 508.

Figure 6A:
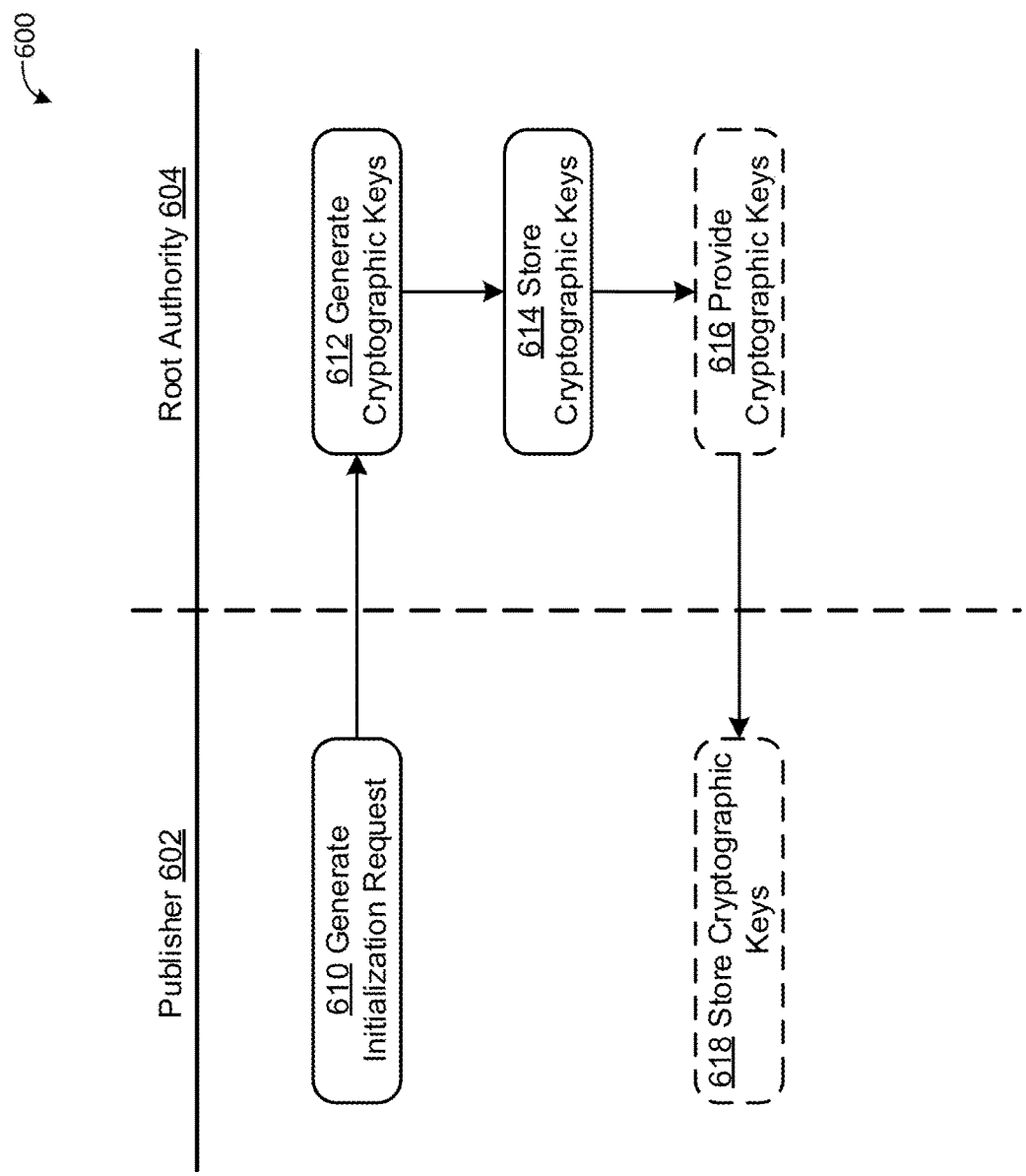
FIG. 6A illustrates an overview of an example process flow for initializing aspects of content delivery verification by a publisher.

FIG. 6A illustrates an overview of an example process flow 600 for initializing aspects of content delivery verification by a publisher. As illustrated, process flow 600 occurs between publisher 602 and root authority 604, each of which may be similar to other example publishers and root authorities described herein. Process flow 600 begins at operation 610, where publisher 602 generates an initialization request. In examples, publisher 602 generates the initialization request so as to become a publisher that is known to root authority 604. In examples, the initialization request comprises information associated with the publisher, including, but not limited to, one or more IP addresses, cryptographic keys, and/or industries associated with the publisher.

At operation 612, the initialization request is received by root authority 604, causing root authority 604 to generate one or more cryptographic keys. In examples, root authority 604 generates a symmetrical cryptographic key or an asymmetrical key pair (e.g., a private cryptographic key and a public cryptographic key). In other examples, operation 612 may be optional, such that publisher 602 instead provides one or more cryptographic keys to root authority 604 as part of the initialization request.

Moving to operation 614, the cryptographic keys are stored. In examples, storing the cryptographic keys comprises associating at least a part of the information of the initialization request with the cryptographic keys in a data store to generate a record for publisher 602. In another example, the record for publisher 602 is indexed based at least in part on an industry provided by publisher 602, such that publisher 602 and other similar publishers may be identified (e.g., thereby enabling a content source to specify a group of publishers associated with a specific industry for which its content should be displayed).

Operations 616 and 618 are illustrated in dashed boxes, thereby indicating that, in some aspects, process flow 600 is performed without performing at least one of operations 616 and 618. At operation 616, the generated cryptographic keys are provided to publisher 602 as a response to the initialization request that was received as a result of operation 610. Accordingly, at operation 618, publisher 602 stores the received cryptographic keys for later reference. In other examples, the cryptographic keys are not shared with publisher 602 and are instead retained by root authority 604 for use in generating secured content and/or cryptographic packages according to aspects described herein.

Figure 6B:
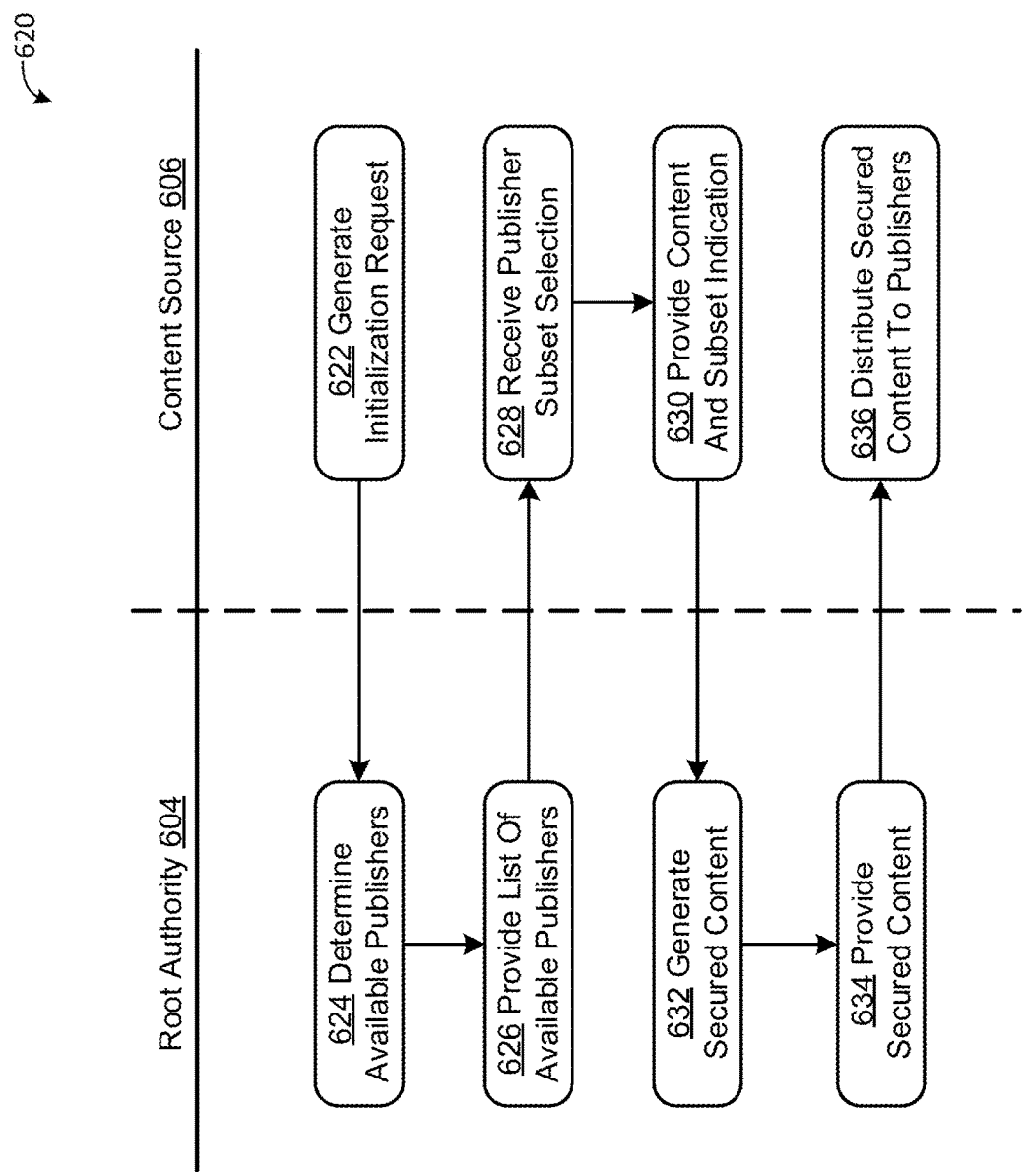
FIG. 6B illustrates an overview of an example process flow for initializing aspects of content delivery verification by a content source.

FIG. 6B illustrates an overview of an example process flow 620 for initializing aspects of content delivery verification by a content source. As illustrated, process flow 620 occurs between root authority 604 and content source 606, each of which may be similar to other example root authorities and content sources described herein. In examples, aspects of process flow 620 are performed by a content source in order to provide supplemental content in conjunction with articles and/or other primary content from a publisher (e.g., publisher 602 in FIG. 6A).

Process flow 620 begins at operation 622, where an initialization request is generated by content source 606. In examples, the initialization request comprises an indication as to the type of content made available by content source 606, as well as an intended audience, mobile device platform type, and/or geographic region, among other examples. In other examples, the initialization request comprises an indication as to an industry for which supplemental content of content source 606 would be relevant. In an example, the initialization request is received by root authority 604 as a web form submission from content source 606.

In response to the initialization request, root authority 604 determines a list of available publishers at operation 624. In some examples, the list of available publishers is determined based on an indication received as part of the initialization request (e.g., relating to one or more industries, publishers that accept a specific content type, etc.). While example criteria are described, it will be appreciated that the list of available publishers may be determined using any of a variety of criteria.

The determined list of available publishers is provided to content source 606 at operation 626. In an example, the list may be provided for display on a computing device (e.g., as a web page, as data for display by an application executing on a computing device, etc.). Based on the list of available publishers, a publisher subset selection may be received at the display at operation 628. As an example, a user may provide a selection at a generated interface comprising at least a part of the list of available publishers that was provided at operation 626.

At operation 630, an indication as to the selected subset of publishers is provided in combination with supplemental content from content source 606. In examples, the indication indicates one or more publishers having articles with which supplemental content from content source 606 should be provided. For example, the indication may comprise a list of specific publishers, publishers associated with one or more industries, etc. Based on the content and the indicated publishers, root authority 604 generates secured content at operation 632. In examples, generating secured content comprises encrypting and/or cryptographically signing at least a part of the supplemental content from content source 606 based on a cryptographic key associated with an indicated publisher. In some examples, a cryptographic key is generated for and associated with a specific subset of publishers. In other examples, a token is generated based on one or more cryptographic keys associated with the subset of publishers, which may then be associated with the provided content. It will be appreciated that other techniques may be used for generating secured content based on an indicated subset of publishers.

Moving to operation 634, the secured content is provided to content source 606. In some examples, all of the secured content is provided, such that it may be decrypted and/or verified by aspects of a cryptographic package as described herein. In other examples, a reference or only a part of the secured content is provided, such that it may be necessary to communicate with root authority 604 in order to display the content in conjunction with an article from a publisher. While example techniques are described herein for providing the secured content, it will be appreciated that any of a variety of other techniques may be used.

At operation 636, the secured content is distributed to one or more publishers. As described herein, the secured content may be directly provided to a publisher, a tag or other reference may be provided for inclusion in an article of a publisher (thereby enabling a client device to access the secured content), and/or a content marketplace may be used, among other examples. Flow terminates at operation 636.

Figure 6C:
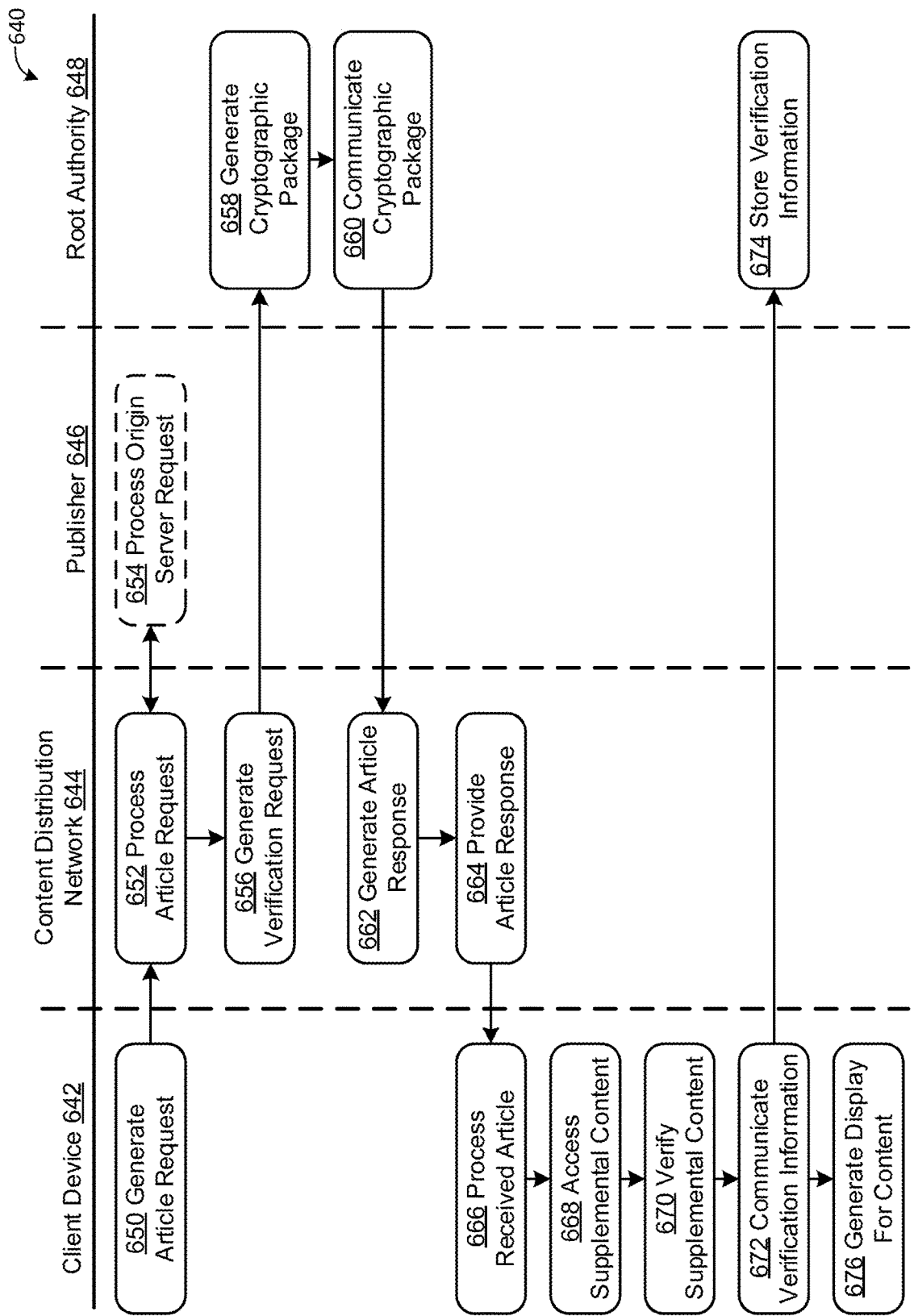
FIG. 6C illustrates an overview of an example process flow for performing aspects of content delivery verification by a client device, content distribution network, publisher, and root authority.

FIG. 6C illustrates an overview of an example process flow 640 for performing aspects of content delivery verification. As illustrated, process flow 640 occurs between client device 642, content distribution network 644, publisher 646, and root authority 648, each of which may be similar to other examples described herein. In examples, aspects of process flow 640 may be performed when an article is accessed by a client device and secured content is accessed for display in conjunction with the article.

Process flow 640 starts at operation 650, where an article request is generated. In an example, the article request is generated by a web browser executing on client device 642, which may receive a user indication to access a web page of publisher 646. In another example, the content request is generated by an application executing on client device 642, wherein the application may access other primary provided by publisher 646. While example article requests are described, it will be appreciated that any of a variety of article requests may be generated.

At operation 652, the article request may be processed by content distribution network 644. In examples, processing the article request comprises determining whether the requested article is cached by content distribution network 644. In such examples, if it is determined that the article is not cached, an origin request may be generated, which may be processed by publisher 646 at operation 654. However, operation 654 is illustrated using a dashed box to indicate that, if the article is cached or otherwise stored by content distribution network 644, an origin request may not be generated and operation 654 may not occur.

At operation 656, a verification request may be generated. In an example, the verification request may be generated to subsequently be able to ensure that the article from publisher 646 is not altered or displayed at a device other than client device 642. In some examples, the verification request may enable supplemental content to be displayed in combination with articles from publisher 646, wherein the supplemental content may be secured content according to aspects described herein. In examples, the verification request comprises a variety of request information associated with the article request generated by client device 642 at operation 650. Example request information includes, but is not limited to, a geographic location associated with client device 642, an IP address, one or more cookies (e.g., associated with a session of client device 642 with publisher 646 and/or content distribution network 644, etc.), a user agent, and/or identifying information associated with the article (e.g., a globally unique identifier (GUID), a cryptographic hash or field, at least a part of the article, etc.).

Moving to operation 658, root authority 648 generates a cryptographic package according to aspects described herein. In examples, the cryptographic package comprises a cryptographic signature or other field useable to verify the integrity of the article, which may be generated by cryptographically signing a hash or at least a part of the article, among other examples, using a cryptographic key associated with publisher 646 (e.g., as may have been generated and/or stored as a result of the publisher registering or otherwise being known to root authority 648, as may be established by performing aspects of process flow 600 in FIG. 6A). In some examples, the cryptographic package comprises executable instructions useable by a client device (e.g., client device 642) to verify the integrity of the article and/or supplemental content (e.g., using a cryptographic signature as described above, by generating a request to root authority 648, etc.). While examples herein are described with respect to performing verification based on a cryptographic signature, it will be appreciated that other information may be contained in the cryptographic package and used to verify articles from publisher 646.

The cryptographic package is communicated to content distribution network 644 at operation 660, such that content distribution network 644 may use the cryptographic package to generate a content response at operation 662. In examples, the generated article response may comprise one or more articles from publisher 646 (e.g., as may be cached by content distribution network 644 and/or accessed from publisher 646 via an origin server request, etc.), as well as the cryptographic package that was generated by root authority 648. Accordingly, the generated article response may be provided to client device 642 at operation 664, such that client device 642 may process the received article at operation 666.

In examples, processing the received article by client device 642 comprises parsing at least a part of the received article to generate a display at client device 642. In some examples, the received article comprises one or more references (e.g., URLs, URIs, content placeholders, etc.) to supplemental content, which may be used by client device 642 to access and load such supplemental content at operation 668. As an example, supplemental content is accessed from a web server, from another content distribution network, and/or from a content marketplace, among other examples. According to aspects disclosed herein, the supplemental content is secured content, which, in some examples, may have been generated by performing at least some aspects of process flow 620 in FIG. 6B.

At operation 670, the article received from content distribution network 644 as a result of operation 664 and the supplemental content accessed at operation 668 is verified based at least in part on the cryptographic package that was generated by root authority 648 at operation 658. For example, executable instructions of the cryptographic package are executed by client device 642 to generate a cryptographic signature of the received article and/or the supplemental content, which may be compared to the cryptographic signature of the cryptographic package. As another example, a token may be received as part of the supplemental content, which is evaluated based on information contained within the cryptographic package in order to confirm that the article originated from publisher 646. It will be appreciated that other verification techniques may be used.

In an example, performing verification at operation 670 generates verification information, which is communicated to root authority 648 at operation 672. For example, the verification information comprises an indication as to whether verification of the received article and the supplemental content was successful, information associated with client device 642 (e.g., user agent, IP address, software/ hardware version information, etc.), information associated with content distribution network 644 and/or publisher 646 (e.g., one or more IP addresses, a content hash, a cryptographic fingerprint, etc.), and/or why verification succeeded or failed, among other information. Verification information may be stored for diagnostics, auditing, or other purposes by root authority 648 at operation 674.

At operation 676, a display for the content is generated. In examples, the display comprises an article of publisher 646 (e.g., as received due to operation 664) and supplemental content (e.g., as accessed at operation 668). As described herein, the supplemental content is content from the content source (e.g., in instances where verification is successful). In other instances, however, alternate content may be displayed in place of the supplemental content when verification is not successful. Flow terminates at operation 676.

Figure 7:
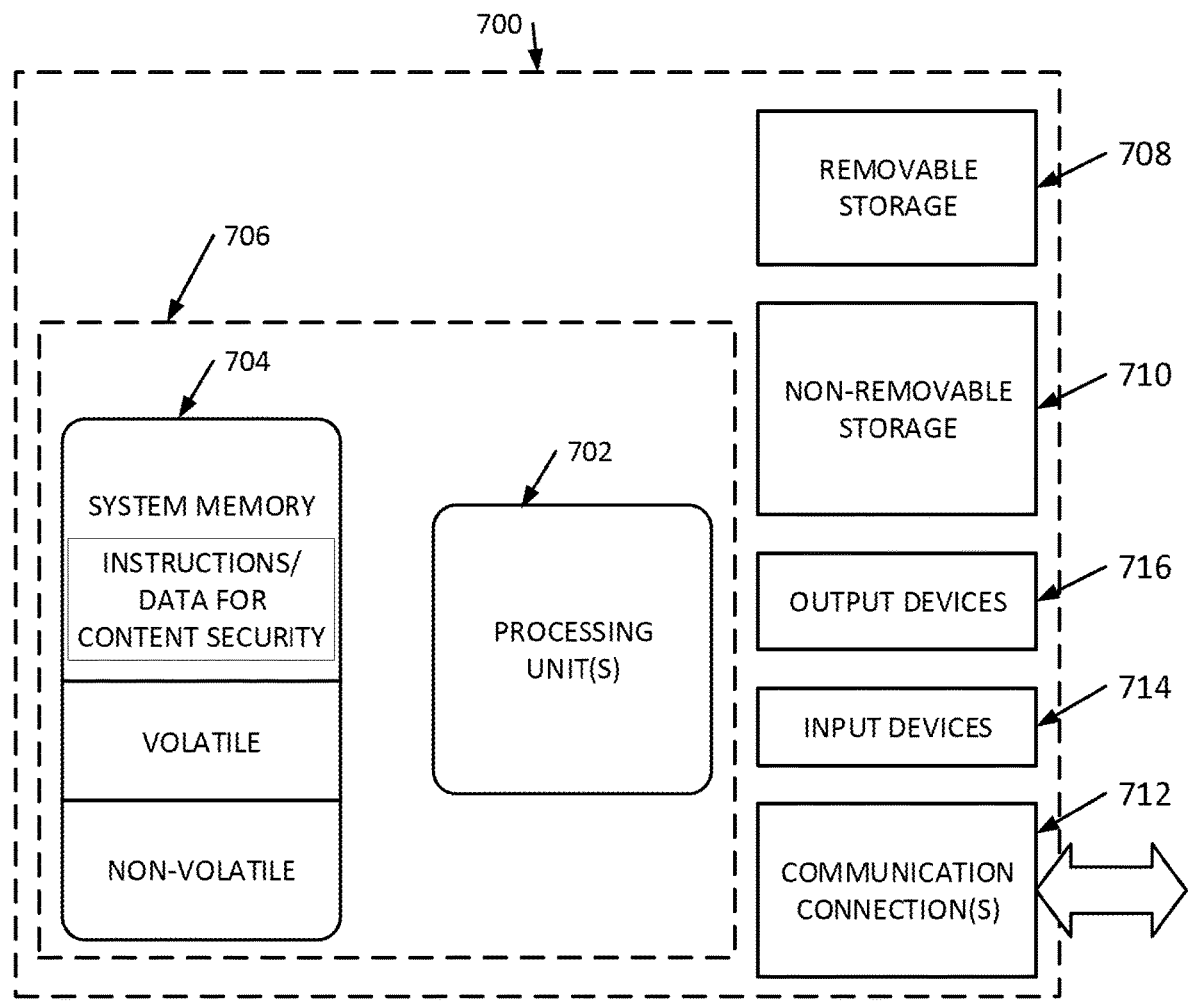
FIG. 7 illustrates one example of a suitable operating environment in which one or more of the present embodiments may be implemented.

FIG. 7 illustrates one example of a suitable operating environment 700, in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, memory and/or cryptographic keys, secured and/or unsecured content, publisher information, instructions to perform the methods disclosed herein, etc.) may be volatile (such as RAM), non-volatile (such as ROM, flash memory, etc.), or some combination of the two. This most basic configuration is illustrated in FIG. 7 by dashed line 706. Further, environment 700 may also include storage devices (removable, 708, and/or non-removable, 710) including, but not limited to, magnetic or optical disks or tape. Similarly, environment 700 may also have input device(s) 714 such as keyboard, mouse, pen, voice input, etc. and/or output device (s) 716 such as a display, speakers, printer, etc. Also included in the environment may be one or more communication connections, 712, such as LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure, one aspect of the technology relates to a system comprising: at least one processor; and memory storing instructions that, when executed by the at least one processor, causes the system to perform a set of operations. The set of operations comprises: generating, by a computing device, a request for primary content associated with a publisher; receiving a response comprising the primary content, wherein the response further comprises a cryptographic package; parsing the primary content to identify a reference to supplemental content; accessing the supplemental content associated with the reference; verifying the supplemental content based at least in part on the primary content and the cryptographic package to determine whether to display the supplemental content; when it is determined to display the supplemental content at the computing device, generating a display of at least a part of the primary content and at least a part of the supplemental content; and when it is determined not to display the supplemental content at the computing device, generating a display of at least a part of the primary content and alternate content. In an example, verifying the supplemental content comprises evaluating one or more cryptographic fields associated with the supplemental content based on cryptographic information associated with the publisher. In another example, verifying the supplemental content comprises communicating with a root authority based on the cryptographic package. In a further example, verifying the supplemental content comprises generating verification information, and wherein the set of operations further comprises: communicating the verification information to a root authority. In yet another example, generating the display of at least a part of the primary content and at least a part of the supplemental content comprises decrypting the at least a part of the supplemental content. In a further still example, the supplemental content comprises at least one of: default content; and content comprising executable instructions to gather additional information. In an example, the supplemental content is accessed from one of: a content marketplace; and a content source.

In another aspect, the technology relates to another system comprising: at least one processor; and memory storing instructions that, when executed by the at least one processor, causes the system to perform a set of operations. The set of operations comprises: receiving, from a computing device, a request for primary content associated with a publisher; generating, in response to the request, a verification request comprising request information associated with the received request; providing the generated verification request to a root authority; receiving, from the root authority, a cryptographic package; generating a response to the request comprising the cryptographic package and the primary content associated with the publisher; and providing the generated response to the computing device. In an example, generating the response comprising the cryptographic package and the primary content comprises: determining the primary content is not available in a cache; and based on determining the primary content is not available in the cache, generating an origin server request to the publisher to access the primary content. In another example, the request information comprises at least one of: a geographic location associated with the computing device; an IP address associated with the computing device; one or more cookies; a user agent; and identifying information associated with the primary content. In a further example, the cryptographic package comprises one or more cryptographic fields based on the identifying information associated with the primary content. In yet another example, at least one of the one or more cryptographic fields is associated with a cryptographic key stored by the root authority associated with the publisher. In a further still example, at least one of the one or more cryptographic fields is associated with a cryptographic key stored by the root authority associated with the publisher.

In a further aspect, the technology relates to a computer-implemented method for content delivery verification. The method comprises: generating, by a computing device, a request for primary content associated with a publisher; receiving a response comprising the primary content, wherein the response further comprises a cryptographic package; parsing the primary content to identify a reference to supplemental content; accessing the supplemental content associated with the reference; verifying the supplemental content based at least in part on the primary content and the cryptographic package to determine whether to display the supplemental content; when it is determined to display the supplemental content at the computing device, generating a display of at least a part of the primary content and at least a part of the supplemental content; and when it is determined not to display the supplemental content at the computing device, generating a display of at least a part of the primary content and alternate content. In an example, verifying the supplemental content comprises evaluating one or more cryptographic fields associated with the supplemental content based on cryptographic information associated with the publisher. In another example, verifying the supplemental content comprises communicating with a root authority based on the cryptographic package. In a further example, verifying the supplemental content comprises generating verification information, and further comprising: communicating the verification information to a root authority. In yet another example, generating the display of at least a part of the primary content and at least a part of the supplemental content comprises decrypting the at least a part of the supplemental content. In a further still example, the alternate content comprises at least one of: default content; and content comprising executable instructions to gather additional information. In another example, the supplemental content is accessed from one of: a content marketplace; and a content source.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
generating, by a computing device, a request for primary internet content associated with a publisher;
receiving a response comprising the primary internet content, wherein the response further comprises a cryptographic package associated with verification, by a root authority, of the publisher;

parsing the primary internet content to identify a reference to supplemental content;

accessing the supplemental content associated with the reference;

verifying the supplemental content based at least in part on the primary internet content and the cryptographic package to determine whether to display the supplemental content;

when it is determined to display the supplemental content at the computing device, generating a display of at least a part of the primary internet content and at least a part of the supplemental content; and when it is determined not to display the supplemental content at the computing device, generating a display of at least a part of the primary internet content and alternate content.

2. The system of claim 1, wherein verifying the supplemental content comprises evaluating one or more cryptographic fields associated with the supplemental content based on the cryptographic package associated with the publisher.

3. The system of claim 1, wherein verifying the supplemental content comprises communicating with a root authority based on the cryptographic package.

4. The system of claim 1, wherein verifying the supplemental content comprises generating verification information, and wherein the set of operations further comprises:
communicating the verification information to a root authority.

5. The system of claim 1, wherein generating the display of at least a part of the primary internet content and at least a part of the supplemental content comprises decrypting the at least a part of the supplemental content.

6. The system of claim 1, wherein the supplemental content comprises at least one of:
default content; and
content comprising executable instructions to gather additional information.

7. The system of claim 1, wherein the supplemental content is accessed from one of:
a content marketplace; and
a content source.

8. A system comprising:
at least one processor; and
memory storing instructions that, when executed by the at least one processor, causes the system to perform a set of operations, the set of operations comprising:
receiving, from a computing device, a request for primary internet content associated with a publisher;
generating, in response to receiving the request, a verification request comprising request information associated with the received request;
providing the generated verification request to a root authority;
receiving, from the root authority, in response to the verification request, a cryptographic package associated with verification of the publisher;
generating a response to the request for the primary internet content comprising
the received cryptographic package;
the primary internet content associated with the publisher; and
a set of instructions that, when executed by the computing device, cause the computing device to:
verify supplemental content associated with the primary internet content based at least in part on the cryptographic package; and
when the supplemental content is verified, generate a display of at least a part of the primary internet content and the supplemental content; and
providing the generated response to the computing device.

9. The system of claim 8, wherein generating the response comprising the cryptographic package and the primary internet content comprises:
determining the primary internet content is not available in a cache; and
based on determining the primary internet content is not available in the cache, generating an origin server request to the publisher to access the primary internet content.

10. The system of claim 8, wherein the request information comprises at least one of:
a geographic location associated with the computing device;
an IP address associated with the computing device;
one or more cookies;
a user agent; and
identifying information associated with the primary internet content.

11. The system of claim 10, wherein the cryptographic package comprises one or more cryptographic fields based on the identifying information associated with the primary internet content.

12. The system of claim 11, wherein at least one of the one or more cryptographic fields is associated with a cryptographic key stored by the root authority associated with the publisher.

13. The system of claim 8, wherein the primary internet content comprises at least one reference to the supplemental content.

14. A computer-implemented method for content delivery verification, comprising:
generating, by a computing device, a request for primary internet content associated with a publisher;
receiving a response comprising the primary internet content, wherein the response further comprises a cryptographic package associated with verification, by a root authority, of the publisher;
parsing the primary internet content to identify a reference to supplemental content;
accessing the supplemental content associated with the reference;
verifying the supplemental content based at least in part on the primary internet content and the cryptographic package to determine whether to display the supplemental content;
when it is determined to display the supplemental content at the computing device, generating a display of at least a part of the primary internet content and at least a part of the supplemental content; and
when it is determined not to display the supplemental content at the computing device, generating a display of at least a part of the primary internet content and alternate content.

15. The computer-implemented method of claim 14, wherein verifying the supplemental content comprises evaluating one or more cryptographic fields associated with the supplemental content based on the cryptographic package associated with the publisher.

16. The computer-implemented method of claim 14, wherein verifying the supplemental content comprises communicating with a root authority based on the cryptographic package.

17. The computer-implemented method of claim 14, wherein verifying the supplemental content comprises generating verification information, and further comprising:
   communicating the verification information to a root authority.

18. The computer-implemented method of claim 14, wherein generating the display of at least a part of the primary internet content and at least a part of the supplemental content comprises decrypting the at least a part of the supplemental content.

19. The computer-implemented method of claim 14, wherein the alternate content comprises at least one of:
   default content; and
   content comprising executable instructions to gather additional information.

20. The computer-implemented method of claim 14, wherein the supplemental content is accessed from one of:
   a content marketplace; and
   a content source.

* * * * *